(12) United States Patent
Sakamoto et al.

(10) Patent No.: US 6,650,390 B2
(45) Date of Patent: Nov. 18, 2003

(54) LIQUID CRYSTAL DISPLAY PANEL HAVING FLOATING PIXEL ELECTRODE

(75) Inventors: Michiaki Sakamoto, Tokyo (JP); Teruaki Suzuki, Tokyo (JP); Mamoru Okamoto, Tokyo (JP); Masayoshi Suzuki, Tokyo (JP); Toshiya Ishii, Tokyo (JP); Hiroaki Matsuyama, Tokyo (JP); Kiyomi Kawada, Tokyo (JP); Seiji Suzuki, Tokyo (JP); Yoshihiko Hirai, Tokyo (JP); Yuji Yamamoto, Tokyo (JP)

(73) Assignee: NEC LCD Technologies, Inc., Tokyo (JP)

( * ) Notice: Subject to any disclaimer, the term of this patent is extended or adjusted under 35 U.S.C. 154(b) by 291 days.

(21) Appl. No.: 09/798,564

(22) Filed: Mar. 2, 2001

(65) Prior Publication Data
US 2001/0019392 A1 Sep. 6, 2001

(30) Foreign Application Priority Data
Mar. 3, 2000 (JP) .......................... 2000-058674

(51) Int. Cl.[7] .............................................. G02F 1/1343
(52) U.S. Cl. ........................... 349/143; 349/38; 349/129
(58) Field of Search .......................... 349/143, 129, 349/38, 43

(56) References Cited
U.S. PATENT DOCUMENTS

| | | | | |
|---|---|---|---|---|
| 5,042,918 A | * | 8/1991 | Suzuki | 349/42 |
| 5,717,474 A | * | 2/1998 | Sarma | 349/85 |
| 5,933,208 A | * | 8/1999 | Kim | 349/106 |
| 6,407,791 B1 | * | 6/2002 | Suzuki et al. | 349/129 |

FOREIGN PATENT DOCUMENTS

| | | | | |
|---|---|---|---|---|
| JP | 07-311383 | | 11/1985 | ......... G02F/1/1337 |
| JP | 62180326 A | * | 8/1987 | ........... G02F/1/133 |
| JP | 62-200329 | | 9/1987 | ............. F02F/1/133 |
| JP | 6-242433 | | 9/1994 | ......... G02F/1/1333 |
| JP | 2565639 | | 10/1996 | ......... G02F/1/1337 |
| JP | 10-096929 | | 4/1998 | ......... G02F/1/1337 |

* cited by examiner

Primary Examiner—Toan Ton
Assistant Examiner—Andrew Schechter
(74) Attorney, Agent, or Firm—Hayes Soloway P.C.

(57) ABSTRACT

A liquid crystal display panel comprises a TFT substrate unit having a thin film transistor (TFT), a control electrode connected to the TFT, a flattening film covering the control electrode, and a pixel electrode having a cross slit and formed on the flattening film and insulated from the control electrode. An opposite substrate unit has an opposite electrode facing the pixel electrode at a predetermined position. A liquid crystal layer disposed between the TFT substrate unit and the opposite substrate includes liquid crystal molecules having negative dielectric aeolotropy. When voltage is supplied between the control electrode and the opposite electrode, an electric field is generated between them. The electric field divides the liquid crystal layer into four domains in each pixel according to the cross slit formed in the pixel electrode.

15 Claims, 8 Drawing Sheets

LIQUID CRYSTAL DISPLAY PANEL HAVING FLOATING PIXEL ELECTRODE

BACKGROUND OF THE INVENTION

This invention relates to a liquid crystal display panel, in particular, to a multi-domain color liquid crystal display panel having excellent visual characteristics.

Generally, a liquid crystal display (LCD) panel of an active matrix type comprises a TFT substrate unit, an opposite substrate unit opposed to the TFT substrate unit, and a liquid crystal layer disposed between the TFT substrate unit and the opposite substrate unit. The TFT substrate unit includes a thin film transistor and a pixel electrode for each pixel on a transparent substrate. The opposite substrate unit has a color filter layer, a black matrix, and an opposite or common electrode on a transparent substrate.

A twisted nematic type (which will be abbreviated to a TN type) LCD panel is well known as a conventional LCD panel having the above-mentioned structure. The TN type LCD panel includes liquid crystal molecules in the liquid crystal layer and the liquid crystal molecules have twisted orientation. The twisted orientation has a first direction parallel to a predetermined direction on a side of the TFT substrate unit and a second direction perpendicular to the predetermined direction on a side of the opposite substrate unit. That is, the orientation is continuously changed by 90 degrees from the first direction to the second direction between the TFT substrate unit and the opposite substrate unit.

The TN type LCD panel has a first polarizing film having a first transmission axis parallel to the predetermined direction on an outside surface of the TFT substrate unit. Moreover, a second polarizing film having a second transmission axis perpendicular to the predetermined direction on an outside surface of the opposite substrate unit.

With this structure, incident light on the outside of the first polarizing film is linearly polarized when it passes through the first polarizing film. The linear polarized light going into the liquid crystal layer travels to the second polarizing film with rotation of its transmission plane. Accordingly, the linear polarized light has the transmission plane parallel to the second direction on the side of the opposite substrate unit and can pass through the second polarizing film. The rotation of the transmission plane is caused by rotatory polarization and birefringence of the liquid crystal layer.

If voltage is supplied between the pixel electrode and the opposite electrode, the liquid crystal molecules between the pixel electrode and the opposite electrode are rearranged so that their longitudinal axes are perpendicular to both of the transparent substrates. In this state, the linear polarized light going into the liquid crystal layer through the first polarizing film travels to the second polarizing film without the rotation of the transmission plane. Consequently, the linear polarized light has the transmission plane perpendicular to the second direction and can not pass through the second polarizing film.

Thus, the TN type LCD panel controls penetration/obstruction of the light by using change of the state of the liquid crystal layer and thereby it displays characters and/or pictures.

However, the TN type LCD panel has a problem that it has narrow viewing angle and insufficient visual characteristics This is because it uses the birefringence of the liquid crystal layer.

The problem is solved by a vertical aligned type (which will be abbreviated to a VA type) LCD panel. The VA type LCD panel comprises liquid crystal molecules have negative dielectric aeolotropy and orientation perpendicular to both of transparent substrates. The orientation is called homeolotropic orientation.

In the VA type LCD panel, the pixel electrode and the opposite electrode are designed so as to generate an electric field inclined against the initial orientation when voltage is supplied between the pixel electrode and the opposite electrode. The electric field makes the liquid crystal molecules fall down in a direction so that the longitudinal axes of the liquid crystal molecules become parallel to the transparent substrates. Thus, the VA type LCD panel can display the characters and/or the pictures by changing the penetration of the light in the liquid crystal layer.

By dividing each pixel into a plurality of domains, the VA type LCD panel can have a wide viewing angle and excellent visual characteristics. In each domain, the liquid crystal molecules fall down toward a predetermined direction different from that of other domains. Such a VA type LCD panel is called a multi-domain LCD panel.

Several methods are known to form domains in the pixel. For example, the domains can be formed by forming slopes (e.g. projection, cavity, or the like) on the opposite electrode and/or the pixel electrode. Moreover, the domains can be formed by forming at least one slit for the pixel in the opposite electrode and/or the pixel electrode. Furthermore, the domains can be obtained by dividing the pixel electrode and/or the opposite electrode.

To obtain excellent visual characteristics and high displaying quality, it is necessary that boundaries among domains be exactly located at predetermined positions. A difference between the boundaries and the predetermined positions deteriorates the displaying quality because the liquid crystal molecules are discrete at the boundaries.

Recently, the size of LCD panels has become larger and larger. That is, the size of the transparent substrates has become larger. With the enlargement of the size of the substrates, the position difference between them has become larger. Consequently, each pixel cannot be exactly divided into domains. This is observed when the opposite substrate unit is characterized by having slopes and/or slits.

In addition, the position difference between the substrate units causes deterioration of the numerical aperture when the opposite substrate unit has a color filter layer and a black matrix. That is, transmissivity of the LCD panel deteriorates in this case.

SUMMARY OF THE INVENTION

It is therefore an object of this invention to provide a vertical aligned type multi-domain color liquid crystal display panel having excellent visual characteristics.

It is another object of this invention to provide a vertical aligned type multi-domain color liquid crystal display panel having a TFT substrate unit having a color filter, a black matrix, and an orientation control structure on a transparent substrate.

It is still another object of this invention to provide a vertical aligned type multi-domain color liquid crystal display panel capable of suppressing deterioration of displaying quality with enlargement of size.

It is still another object of this invention to provide a vertical aligned type multi-domain color liquid crystal display panel capable of being easily manufactured.

Other objects of this invention will become clear as the description proceeds.

According to an aspect of this invention, a liquid crystal display panel includes a first substrate, a TFT transistor formed on the first substrate, a pixel electrode formed on the first substrate to connect to the TFT transistor, a second substrate opposed to the first substrate, an opposite electrode formed on the second substrate to face to the pixel electrode at a predetermined interval, and a liquid crystal layer disposed between the pixel electrode and the opposite electrode. The liquid crystal display panel comprises a control electrode formed on the first substrate instead of the pixel electrode. An insulation film is formed on the first substrate to cover the control electrode. A floating electrode having a slit at a predetermined position is formed on the insulation film to face the opposite electrode at the predetermined interval.

According to another aspect of this invention, a method is for manufacturing a liquid crystal display panel including a first substrate, a TFT transistor formed on the first substrate, a pixel electrode formed on the first substrate to connect to the TFT transistor, a second substrate opposed to the first substrate, an opposite electrode formed on the second substrate to face to the pixel electrode at a predetermined interval, and a liquid crystal layer disposed between the pixel electrode and the opposite electrode. The method comprises forming a control electrode on the first substrate instead of the pixel electrode, forming an insulation film on the first substrate to cover the control electrode, forming a floating electrode on the insulation film to face the opposite electrode at the predetermined interval, and partially removing the floating electrode to form a slit at a predetermined position.

According to still another aspect of this invention, a liquid crystal display panel includes a first transparent substrate, a second transparent substrate, a liquid crystal layer sandwiched between the first transparent substrate and the second transparent substrate, and a color filter layer. The liquid crystal layer is driven in a state where it divided into a plurality of domains. The liquid crystal display panel comprises a gate bus formed on the first transparent substrate. A data bus is formed on the first transparent substrate to be insulated from the gate bus and perpendicular to the gate bus. A thin film transistor is formed on the first transparent substrate and connected to both of the gate bus and the data bus. A first flattening film is formed on the color filter layer formed on the first transparent substrate to cover the gate bus, the data bas and the thin film transistor. A control electrode is formed on the first flattening film and connected to the thin film transistor through a contact hole formed in both the first flattening film and the color filter layer for being supplied with voltage to control the domains. A second flattening film is formed on the control electrode. A pixel electrode is formed on the second flattening film and insulated from the control electrode.

According to still further aspect of this invention, a liquid crystal display panel includes a first transparent substrate, a second transparent substrate, a liquid crystal layer sandwiched between the first transparent substrate and the second transparent substrate, and a color filter layer. The liquid crystal layer is driven in a state where it divided into a plurality of domains. The liquid crystal display panel comprises a gate bus formed on the first transparent substrate. A data bus is formed on the first transparent substrate to be insulated from the gate bus and perpendicular to the gate bus. A thin film transistor is formed on the first transparent substrate and connected to both of the gate bus and the data bus. A control electrode is formed on the color filter layer formed on the first transparent substrate. The control electrode is connected to the thin film transistor through a contact hole formed in said color filter layer for being supplied with voltage to control the domains. A flattening film is formed on the control electrode. A pixel electrode is formed on the flattening film and insulated from the control electrode.

According to furthermore aspect of this invention, a method is for manufacturing a liquid crystal display panel including a first transparent substrate, a second transparent substrate, a liquid crystal layer sandwiched between the first transparent substrate and the second transparent substrate, and a color filter layer. The liquid crystal layer is driven in a state where it divided into a plurality of domains. The method comprises forming a gate electrode and a gate bus continuous with the gate electrode on the first transparent substrate, forming a gate insulation film on the first transparent substrate to cover the gate electrode and the gate bus, forming a semiconductor layer formed on the gate insulation film above the gate electrode, forming a source electrode connected to semiconductor layer, a drain electrode connected to semiconductor layer, a data bus continuous with the source electrode on the first transparent substrate, forming a passivation film on the first transparent substrate so as to expose the source electrode, forming a color filter layer on the passivation film at a predetermined area, forming a black matrix on exposed area of the passivation film, forming a control electrode on the color filter layer so as to connect with the source electrode, forming a flattening film to cover the control electrode, and forming a pixel electrode on the flattening film so as to be insulated from the control electrode.

DESCRIPTION OF THE PREFERRED EMBODIMENT

Figure 1:
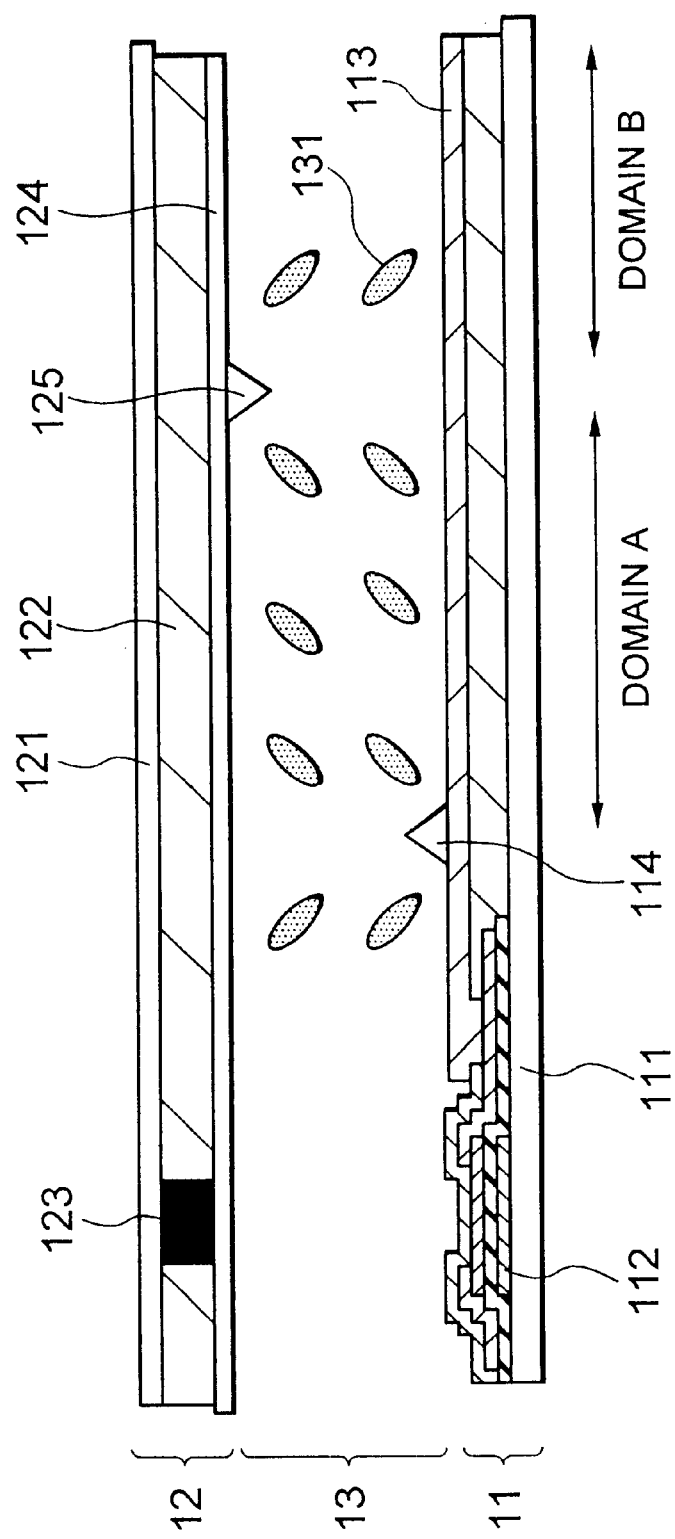
FIG. 1 shows a partial sectional view of a conventional vertical aligned type multi-domain liquid crystal display panel.

Referring to FIG. 1, description will be at first directed to a conventional vertical aligned type multi-domain color liquid crystal display panel for a better understanding of this invention.

In FIG. 1, the liquid crystal display (LCD) panel comprises a TFT substrate unit 11, an opposite substrate unit 12 opposed to the TFT substrate unit 11, and a liquid crystal layer 13. Though FIG. 1 shows one pixel of the liquid crystal display unit, the liquid crystal display has a large number of pixels arranged in matrix.

The TFT substrate unit 11 includes a first transparent insulation substrate 111, a thin film transistor (TFT) 112 formed on the first substrate 111 for each pixel, and a pixel electrode 113 connected to a source electrode of the TFT 112. The pixel electrode 113 has a first projection 114 which is extended in the front and back direction of FIG. 1 and which has a triangular shape in section.

The opposite substrate unit 12 includes a second transparent insulation substrate 121, a color filter 122 formed on the second substrate 121, a black matrix 123, and a opposite electrode 124. The opposite electrode 124 has a second projection 125 which is extended in the front and back of FIG. 1 and which has the triangular shape in section. The first projection 114 and the second projection 125 are alternately arranged in the lateral direction of FIG. 1. It is easy to form the first and the second projections 114 and 125 by selectively depositing additional insulating films under the pixel electrode 113 and the opposite electrode 124, respectively. The first and the second projections 114 and 125 may have trapezoid shapes.

The liquid crystal layer 13 includes a large number of liquid crystal molecules 131 which have negative dielectric aeolotropy. The liquid crystal molecules 131 tend to be perpendicular to surfaces of the pixel electrode 113 and the opposite electrode 124 when voltage is not supplied between the pixel electrode 113 and the opposite electrode 124. Accordingly, the liquid crystal molecules 131 located in the neighborhood of the projections 114 and 125 are perpendicular to the surfaces of the projections 114 and 125 and oblique against main surfaces of the pixel electrode 113 and the opposite electrode 124. The obliquity of the liquid crystal molecules 131 affects neighboring liquid crystal molecules 131. Because the projections 114 and 125 have triangular sections, the liquid crystal molecules 131 incline toward opposite directions in the neighborhood of each projection 114 and 125. For example, in FIG. 1, the liquid crystal molecules 131 incline toward the right hand side in a domain A and incline toward the left hand side in a domain B.

When the voltage is supplied between the pixel electrode 113 and the opposite electrode 124, the liquid crystal molecules 131 fall down toward inclined directions and become parallel to the main surfaces of the pixel electrode 113 and the opposite electrode.

Figure 2:
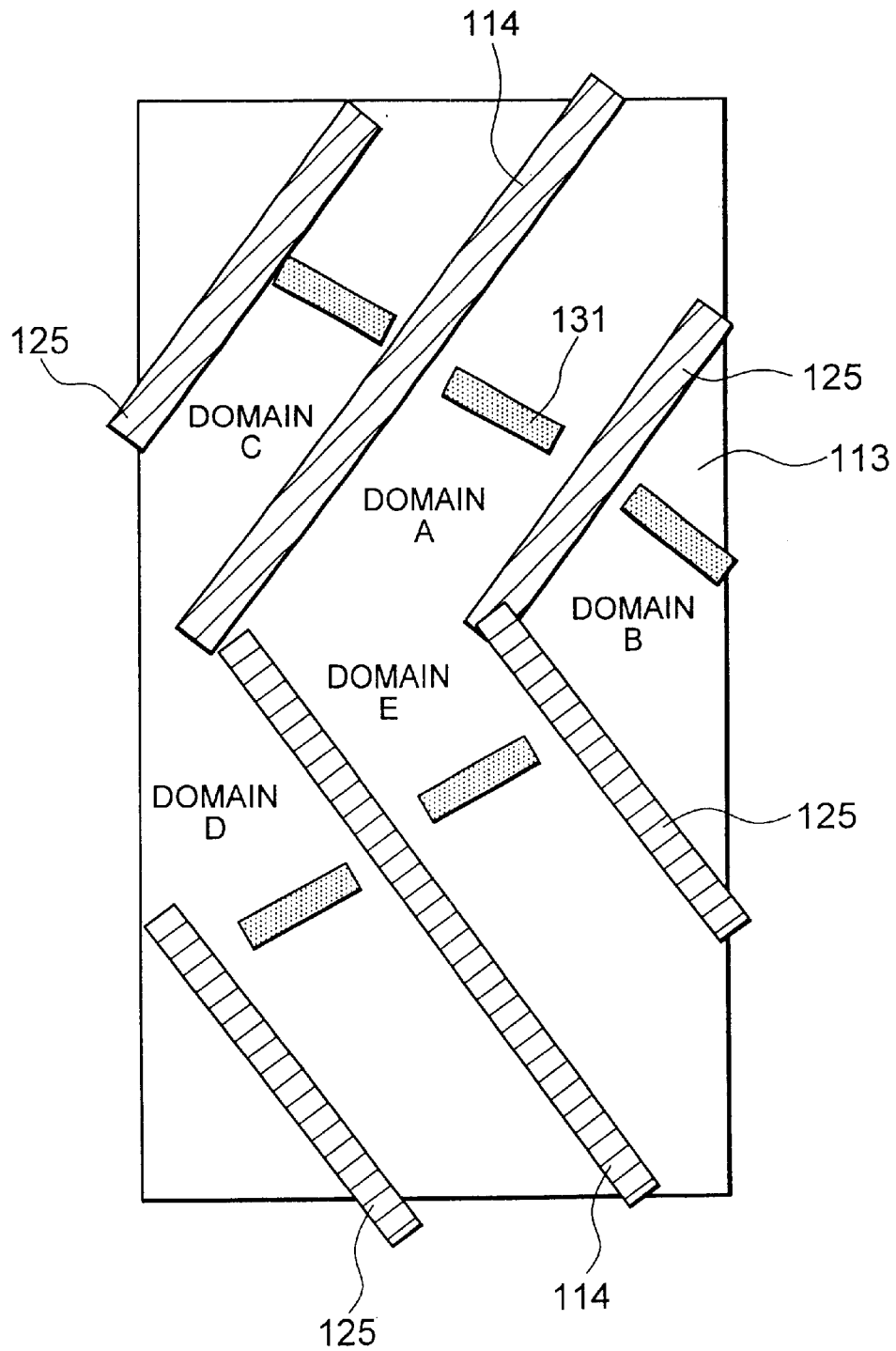
FIG. 2 is a schematic view showing location of projections of the liquid crystal display panel of FIG. 1.

As mentioned above, the domains are provided in each pixel of the conventional VA type color LCD panel. The projections 114 and 125 may be zigzag formed as illustrated in FIG. 2 to increase the number of the domains in each pixel.

Such a LCD panel is disclosed in Unexamined Japanese Patent Publication No. 7-311383. This document further discloses a technique using a slit or an opening window formed in the pixel electrode and/or the opposite electrode to form the domains.

Figure 3:
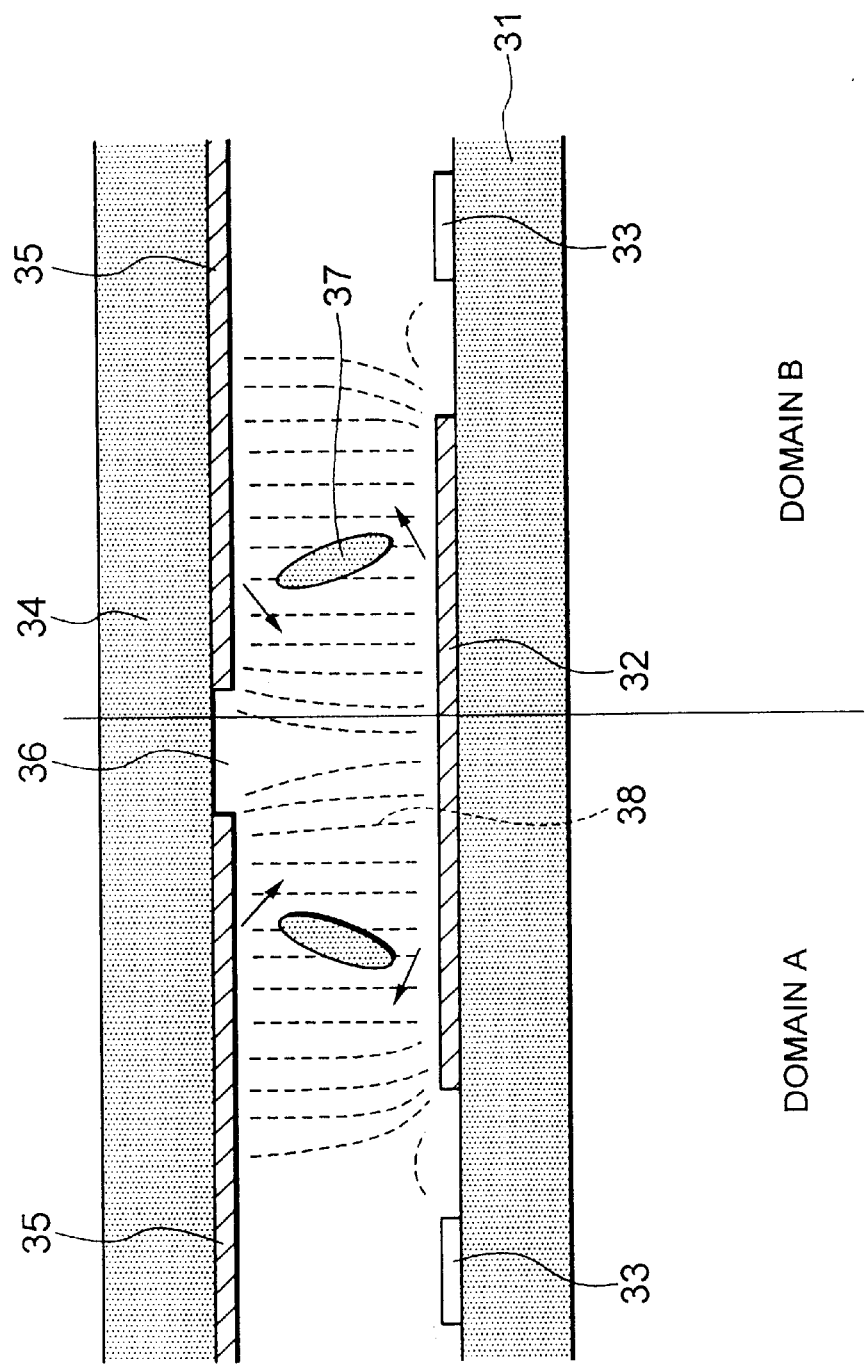
FIG. 3 shows a partial sectional view of another conventional vertical aligned type multi-domain liquid crystal display panel.

In FIG. 3, another conventional VA type multi-domain LCD panel is shown and considerably simplified. The LCD panel comprises a first transparent insulation substrate 31 on which a pixel electrode 32 and data buses 33 are formed. A second transparent insulation substrate 34 on which an opposite electrode 35 is formed is opposed to the first transparent insulation substrate 31. The opposite electrode 35 has a slit or opening window 36 facing the pixel electrode 32. A liquid crystal layer disposed between the first and the second transparent insulation substrates 31 and 34 includes a large number of liquid crystal molecules 37. The liquid crystal molecules 37 have an orientation perpendicular to the first and the second substrate 31 and 34 when voltage is not supplied between the pixel electrode 32 and the opposite electrode 35.

When the voltage is supplied between the pixel electrode 32 and the opposite electrode 35, an electric field represented by electric force lines 38 in FIG. 3 is generated in the liquid crystal layer. The liquid crystal molecules 37 are rearranged by the electric field so as to be perpendicular to the electric force lines 38. Inasmuch as the edges of the pixel electrode 32 and the slit 36 of the opposite electrode 35 bend the electric force lines 38, the liquid crystal molecules 37 turn to opposite directions in the neighborhood of the slit 36 as illustrated by arrows in FIG. 3. Thus, the slit 36 forms domains A and B in the pixel.

Such a LCD panel is disclosed in Japanese Unexamined Patent Publication (JP-A) No. 10-96929 and Japanese Patent Publication (JP-B) No. 2565639.

Referring to FIGS. 4 through 7, the description will proceed to a vertical aligned type color multi-domain liquid crystal display panel according to a preferred embodiment of this invention. Though the LCD panel includes a plurality of pixels arranged in matrix, attention is paid to one of the pixels hereinafter.

Figure 4:
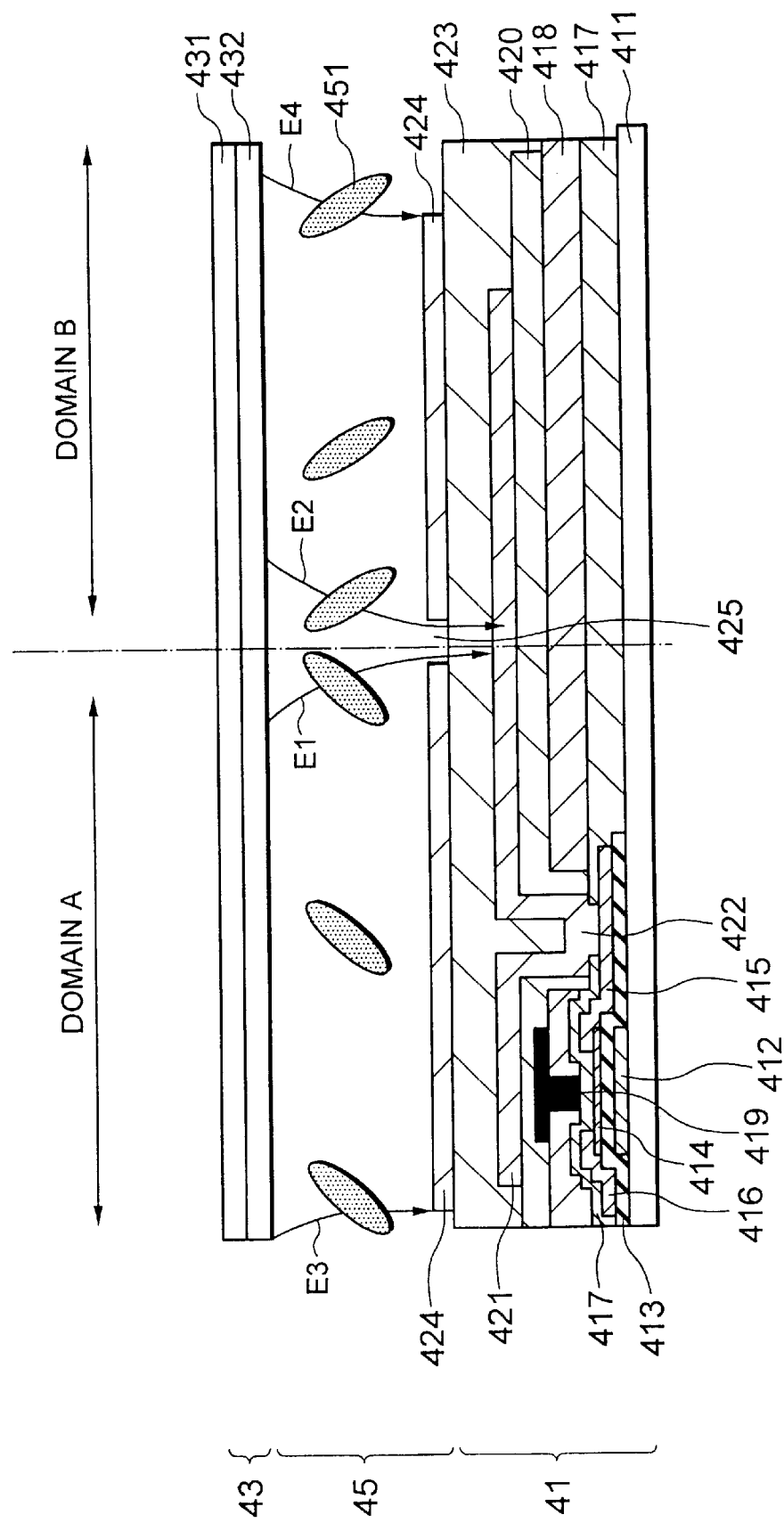
FIG. 4 shows a partial sectional view of a vertical aligned type multi-domain liquid crystal display panel according to a preferred embodiment of this invention.

In FIG. 4, the LCD panel comprises a TFT substrate unit 41 on which a thin film transistor (TFT) is formed for each pixel. The TFT serves as a switching device for driving liquid crystal molecules mentioned after. An opposite substrate unit 43 is opposed to the TFT substrate unit 41 at a predetermined interval. A liquid crystal layer 45 is disposed between the TFT substrate unit 41 and the opposite substrate unit 43. The LCD panel further comprises a pair of polarizing plates (not shown) disposed on outside surfaces of the TFT substrate 41 and the opposite substrate 43, respectively.

The TFT substrate unit 41 has a first transparent insulation substrate 411. A gate electrode 412 is formed on the TFT substrate 41 together with data buses 51 of FIG. 5. A gate insulation film 413 is deposited on the first substrate 411 to cover the gate electrode 412. A semiconductor layer is deposited on the gate insulation film 413 above the gate electrode 412. A source electrode 415 and a drain electrode 416 are deposited on the gate insulation film 413 so as to overlap the semiconductor layer 414. The source electrode 415 and the drain electrode 416 are formed together with data buses 52 of FIG. 5. One of the data buses is continuous with the drain electrode 416. The TFT consists of the gate electrode 412, the gate insulation film 413, the semiconductor layer 414, the source electrode 415, and the drain electrode 416.

Furthermore, the TFT substrate unit 41 has a passivation film 417 to cover the semiconductor layer 414, the source electrode 415, and the drain electrode 416. A color filter layer 418 including is deposited on the passivation film 417. The color filter layer 418 includes red, green, and blue filters. A black matrix 419 is formed on an exposed area of the passivation film 417 through an opening formed in the color filter layer 418 to block light. Correctly, the opening is a gap between two color filters different from each other in color. That is, FIG. 4 does not accurately show lateral position of each film. A first flattening film 420 is deposited on the color filter layer 418 and covers the black matrix 419. A control electrode 421 is deposited on the first flattening film 420. The control electrode 421 is connected to the source electrode 415 through a contact hole 422. The contact hole is formed in both of the passivation film 417 and the color filter layer 418 and covered with the first flattening film 420. A second flattening film 423 is deposited on the first flattening film 420 to cover the control electrode 421. A pixel electrode 424 is deposited on the second flattening film 423 so as to be in an electric floating state. The pixel electrode 424 is called a floating electrode. The pixel electrode 424 has a cross shaped slit 425 (see FIG. 2). A first vertical alignment film (not shown) is deposited on the second flattening film 423 and covers the pixel electrode 424.

The opposite substrate unit 43 has a second transparent insulation substrate 431 and an opposite electrode 432 which is formed on the opposite substrate 43. A second vertical alignment film (not shown) is deposited on the opposite electrode 432 and covers the opposite electrode 432. The second vertical alignment film is opposed to the first vertical alignment film with a predetermined space left between them.

The liquid crystal layer 45 is sealed between the first vertical alignment film and the second vertical alignment film and has a plurality of liquid crystal molecules 451 having negative dielectric aeolotropy.

Figure 5:
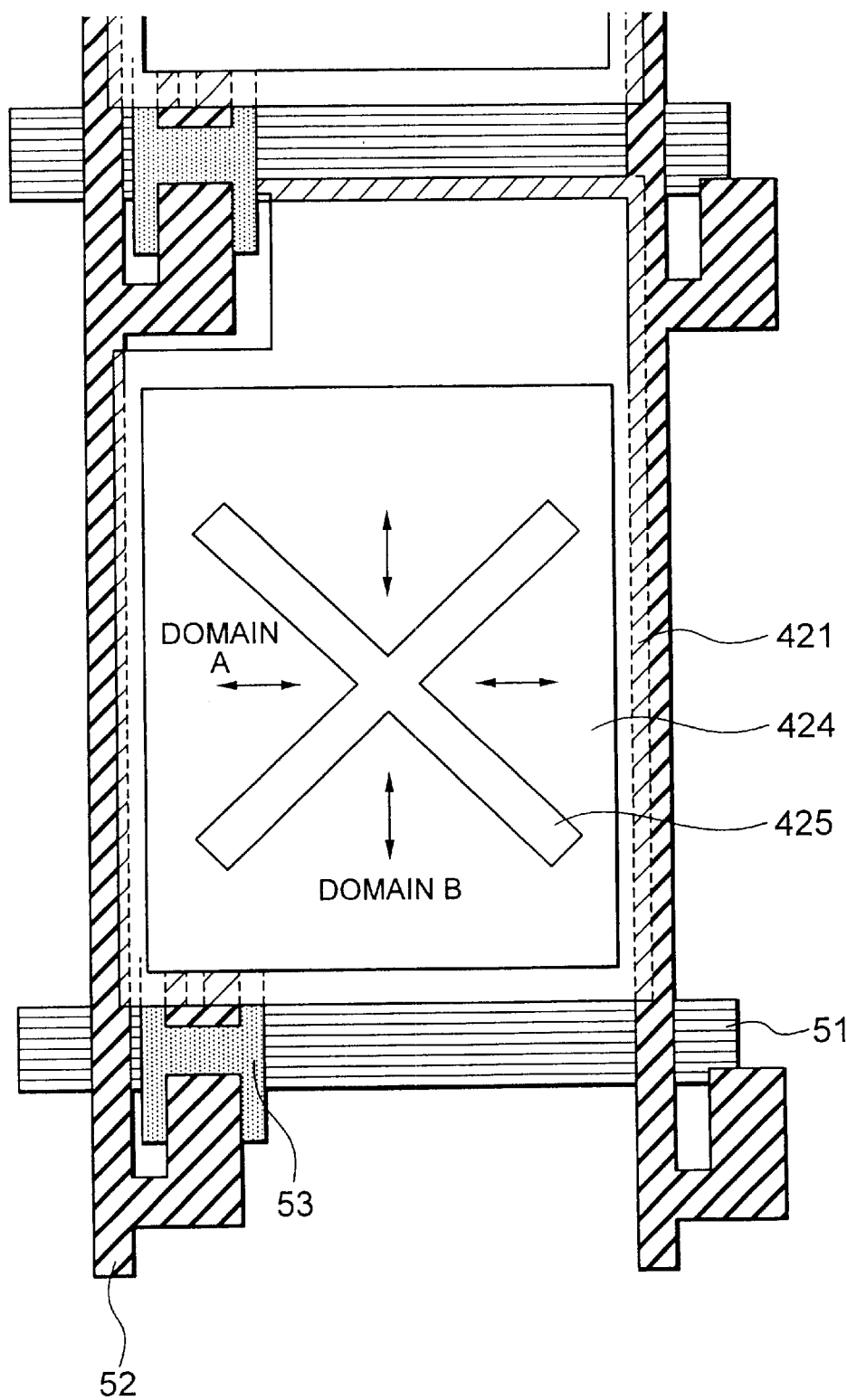
FIG. 5 shows a partial plane view of a TFT substrate unit included in the liquid crystal display panel of FIG. 4.
Figure 6:
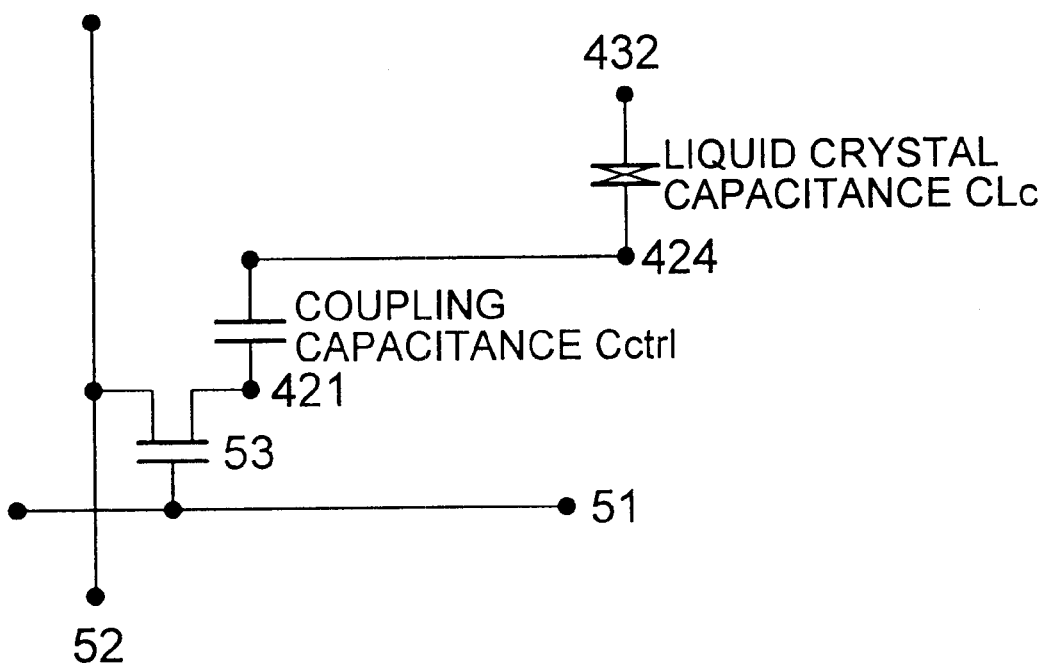
FIG. 6 is an equivalent circuit diagram of a pixel of the liquid crystal display panel of FIG. 4.

Next, an operation of the LCD is explained referring to FIGS. 5 and 6 together with FIG. 4.

To drive the liquid crystal layer 45 of the pixel illustrated in FIG. 5, writing voltage is supplied to the data bus 52 connected to the drain electrode 416 of the pixel when the gate bus 51 connected to the gate electrode 412 of the pixel is selected. That is, the TFT 53 of the pixel turns into an ON state when the gate bus 51 is selected. In this state, the writing voltage supplied to the data bus 52 is supplied to the control electrode 421 through the drain electrode 416, and the source electrode 415. Because the opposite electrode 432 is grounded, voltage difference is caused between the control electrode 421 and the opposite electrode 432. Thus, an electric field is generated in the liquid crystal layer 45. The liquid crystal molecules 451 are rearranged by the electric field so that their shorter axes are parallel to the direction of the electric field. That is, the liquid crystal molecules 451 are parallel to the pixel electrode 424 and the opposite electrode 432.

Here, the pixel electrode 424 has an electric potential $\Delta Vpix$ (absolute value) which is given by:

$$\Delta Vpix = Cctrl/(Cctrl+Clc) \times \Delta Vctrl$$

where, Cctrl is a capacitance (called a coupling capacitance) between the control electrode 421 and the pixel electrode 424, Clc is a capacitance (called a liquid crystal capacitance) between the pixel electrode 424 and the opposite electrode 432, and $\Delta Vctrl$ is control voltage (absolute value). Additionally, a equivalent circuit of the pixel is illustrated in FIG. 6.

As mentioned above, the pixel electrode has the slit 425. The electric field inclines in the neighborhood of the slit 425 as depicted by electric force lines E1 and E2 because the control voltage $\Delta Cctrl$ is larger than the electric potential $\Delta Vpic$. Moreover, the electric field inclines in the neighborhood of edges of the pixel electrode 424 as depicted by electric force lines E3 and E4 which are parallel to the electric force lines E1 and E2. Thus, the electric field reliably forms domains A and B in the pixel of FIG. 4. In FIG. 4, the electric field generally inclines toward the lower right in the domain A and toward the lower left in the domain B. The liquid crystal molecules 451 are inclined by the electric field toward a direction different in each domain. Inasmuch as the slit 425 actually has the cross shape as illustrated in FIG. 5, the liquid crystal molecules fall/rise according to generation/disappearance of the electric field in directions depicted by arrows in FIG. 5. Therefore, the four domains compensate one another for viewing characteristics in each pixel and excellent viewing performance is obtained in the LCD panel.

Next, the description will be made about a manufacturing method of the LCD panel.

At first, manufacturing steps of the TFT substrate 41 is mentioned with referring to FIGS. 7A through 7F.

Figure 7A:
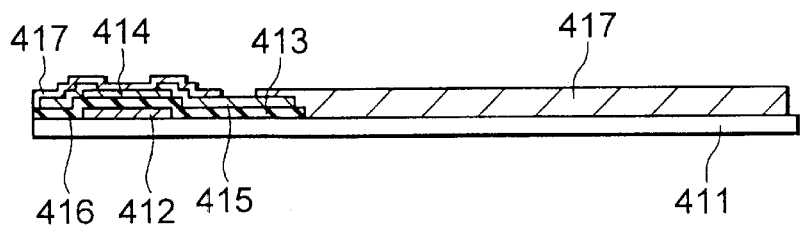
FIGS. 7A–7F show manufacturing steps for manufacturing the TFT substrate unit used in the liquid crystal display panel of FIG. 4.

As illustrated in FIG. 7A, the transparent insulation substrate 411 is prepared and made of, for example, glass. Next, a conductor film of 100–300 nm in thickness is deposited on the substrate 411 by the use of a sputtering method using aluminum, molybdenum, chromium, or the like. The conductor film is patterned by the use of photolithography technique to form the gate electrode 412 and the gate buses 51. An insulation film and a semiconductor film are successively deposited on the top surface of the substrate 411 having the gate electrode 412 and the gate buses 51. The insulation film is, for example, a silicon nitride film and has 200–400 nm in thickness. The semiconductor film consists of, for example, amorphous silicon and has a thickness of 100–400 nm. The semiconductor film is patterned by the use of the photolithography technique to form the semiconductor layer 414. After that, the insulation film is patterned by the use of the photolithography technique to form the gate insulation film 413. A conductor film of 100–300 nm in thickness is formed by the sputtering method using molybdenum, chromium, or the like on the top surface of the substrate 411 having above mentioned films and patterned to form the source electrode 415 and the drain electrode 416. A insulation film, such as a silicon nitride film, of 200–400 nm in thickness deposited by the use of chemical vapor developing method on the top surface of the substrate 411 having above mentioned films and partially removed to form the passivation film 417. The passivation film 417 has an opening at a predetermined position corresponding to the source electrode 415.

Figure 7B:
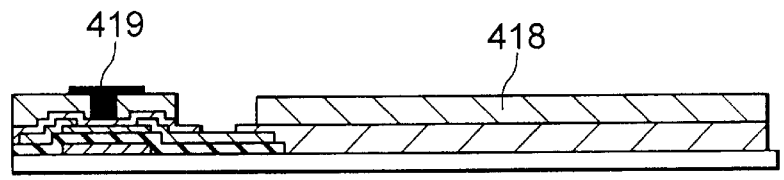

Next, as illustrated in FIG. 7B, an acrylic photosensitive resist layer mixed with pigments is applied to the passivation film 417 by the use of spin coating method. The acrylic photosensitive resist layer of 1–2 μm in thickness is patterned by the use of the photolithography technique to form the color filter layer 418. In this step, the red, the green, and the blue color filters are formed by turns. In addition, the black matrix 419 is formed at the predetermined position by the same way.

Figure 7C:
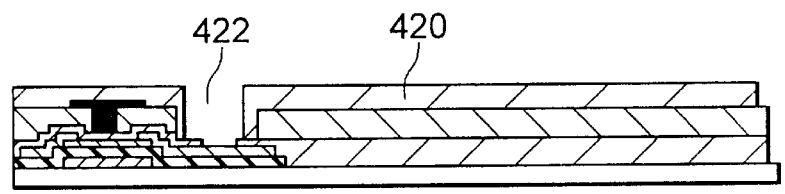

Next, as illustrated in FIG. 7C, a positive type acrylic photosensitive resist layer is applied to the color filter layer 418 and the black matrix 419 by the use of the spin coating method to form the first flattening film 420 of 2–4 μm in thickness. The first flattening film 420 is patterned by the use of the photolithography technique to form the contact hole 422 which partially exposes the source electrode 415 through the opening of the passivation film 417.

Figure 7D:
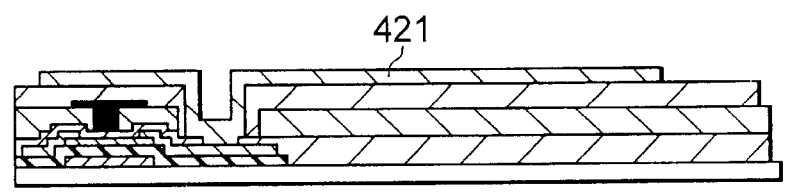

Next, as shown in FIG. 7D, a conduction film of 50–100 nm in thickness is deposited by the use of the sputtering method using ITO (Indium Tin Oxide) or the like on the first flattening film 420 so as to cover the exposed surface in the contact hole 422. The conducting film is patterned by the use of the photolithography technique to form the control electrode 421.

Figure 7E:
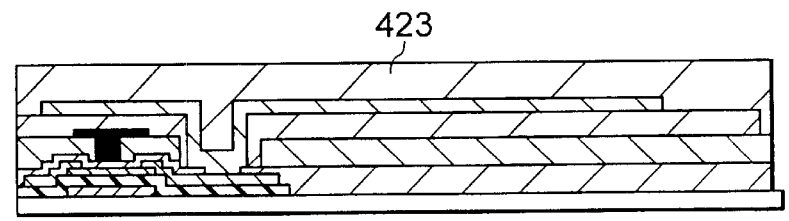

Next, as illustrated in FIG. 7E, a positive type acrylic photosensitive resist layer is applied to the control electrode 421 and the exposed flattening film 420 by the use of the spin coating method to form the second flattening film 423 of 0.1–0.5 μm in thickness.

Figure 7F:
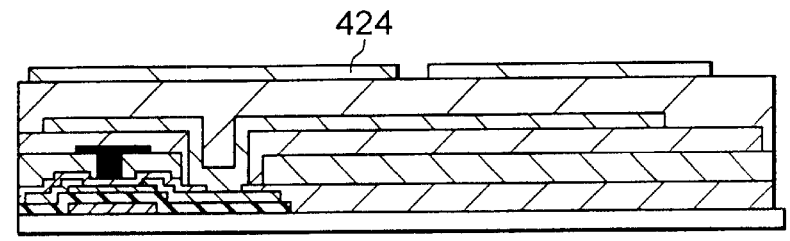

Finally, as shown in FIG. 7F, a conduction film of 50–100 nm in thickness is deposited on the second flattening film 423 by the use of the sputtering method using ITO or the like. The conducting film is patterned by the use of the photolithography technique to form the pixel electrode 424.

As mentioned above, the TFT substrate unit 41 is completed.

With regard to the opposite substrate unit 43, a transparent substrate which is made of, for example, glass is prepared and a conduction film which consists of, for example, ITO is deposited on the substrate by the use of the sputtering method so as to have a thickness of 80–100 nm. The conduction film serves as the opposite electrode 432.

The TFT substrate unit 41 is combined with the opposite substrate unit 43 as mentioned below to form the LCD panel.

At first, vertical alignment films are deposited on the opposite surfaces of the TFT substrate unit 41 and the opposite substrate unit 43, respectively. For instance, the vertical alignment films are formed by the printing method. Moreover, SE-1211produced by Nissan Chemical Company or the like can be used as a material of the vertical alignment films.

Next, seal members are disposed at predetermined positions on the surface of the TFT substrate unit 41 while spherical spacers are scattered on the surface of the opposite substrate unit 43. Then the TFT substrate unit 41 and the opposite substrate unit 43 are stuck to each other. In this state, the seal members are heated to harden. The combination of the TFT substrate 41 and the opposite substrate 43 is cut into a predetermined shape.

Next, the nematic liquid crystal molecules having the negative dielectric aeolotropy are poured into the space formed between the TFT substrate unit 41 and the opposite substrate unit 43 through a pouring hole remaining between two of the seal members. After that, the pouring hole is sealed with photosensitive resin.

Next, negative compensation films are adhered on the outside surfaces of the TFT substrate 41 and the opposite substrate 43, respectively. The polarizing plates are adhered on the negative compensation films, respectively, so that their transmission axes are perpendicular to each other. Thus, an LCD panel is completed.

Necessary peripheral circuits or driving circuits are connected to the LCD panel to form a multi-domain color LCD apparatus.

The LCD apparatus obtained as mentioned above has high contrast, wide viewing angles and steady excellent viewing characteristics. Inasmuch as the liquid crystal layer 45 is certainly divided into the domains in each pixel by the electric field having oblique electric force lines E1–E4 generated between the control electrode 421 and the pixel electrode 424.

In addition, it is unnecessary to precisely match the TFT substrate unit 41 to the opposite substrate unit 43 because the color filter 418, the black matrix 419 and the slit 425 are formed at the TFT substrate unit 41. Accordingly, the LCD panel is suitable for an enlarged size.

Figure 8:
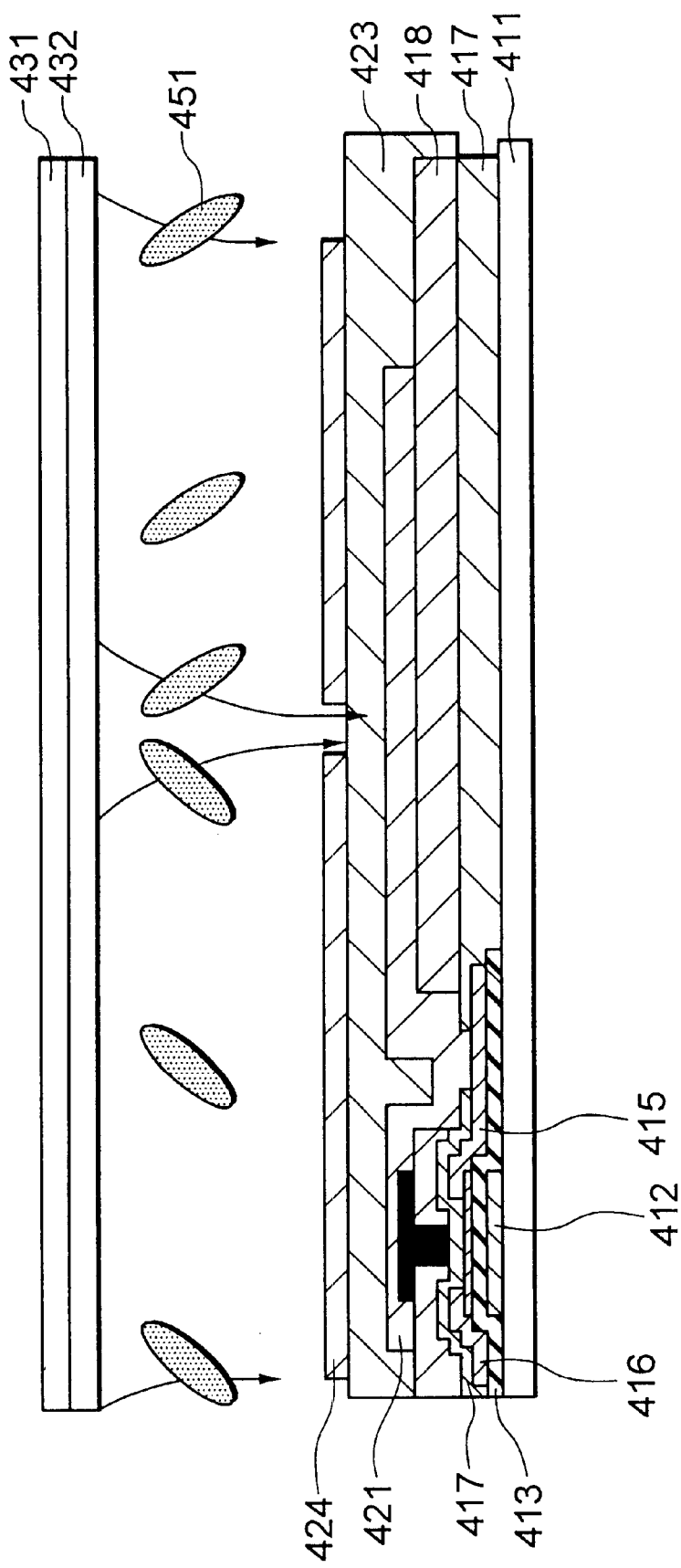
FIG. 8 is a partial sectional view of a modified example of the liquid crystal display panel of FIG. 4.

While this invention has thus far been described in conjunction with the preferred embodiment thereof, it will readily be possible for those skilled in the art to put this invention into practice in various other manners. For example, the first flattening film 420 may be left out to simplify the structure of the LCD panel as illustrated in FIG. 8.

What is claimed is:

1. A liquid crystal display panel including a first substrate, a TFT transistor formed on said first substrate and connected to a data bus and a gate bus, a floating pixel electrode formed on said first substrate to connect capacitively to said TFT transistor, a second substrate opposed to said first substrate, an opposite electrode formed on said second substrate to face to said floating pixel electrode at a predetermined interval, and a liquid crystal layer disposed between said floating pixel electrode and said opposite electrode, said liquid crystal display panel further comprising:

a control electrode formed on said first substrate, and an insulation film formed on said first substrate to cover said control electrode;

wherein said floating pixel electrode has a slit at a predetermined position and is formed on said insulation film to face said opposite electrode at said predetermined interval;

wherein said slit decides a plurality of domains in a pixel and has a cross shape having longitudinal portions disposed at a 45° angle with respect to said gate bus or said data bus.

2. A liquid crystal display panel as claimed in claim 1, said liquid crystal display panel further comprising a color filter, wherein said color filter is formed on said first substrate.

3. A liquid crystal display panel as claimed in claim 1, said liquid crystal display panel further comprising a black matrix, wherein said black matrix is formed on said first substrate.

4. A liquid crystal display panel as claimed in claim 1, wherein said liquid crystal layer includes liquid crystal molecules having negative dielectric aeolotropy and an orientation of a direction perpendicular to said first and said second substrates.

5. A method of manufacturing a liquid crystal display panel including a first substrate, a TFT transistor formed on said first substrate and connected to a data bus and a gate bus, a floating pixel electrode formed on said first substrate to connect capacitively to said TFT transistor, a second substrate opposed to said first substrate, an opposite electrode formed on said second substrate to face to said floating pixel electrode at a predetermined interval, and a liquid crystal layer disposed between said floating pixel electrode and said opposite electrode, said method comprising:

forming a control electrode on said first substrate, forming an insulation film on said first substrate to cover said control electrode, forming said floating pixel electrode on said insulation film to face said opposite electrode at said predetermined interval, and partially removing said floating pixel electrode to form a slit at a predetermined position;

wherein said slit has a cross shape having longitudinal portions disposed at a 45° angle with respect to said gate bus or said data bus.

6. A liquid crystal display panel including a first transparent substrate, a second transparent substrate, a liquid crystal layer sandwiched between said first transparent substrate and said second transparent substrate, and a color filter layer, said liquid crystal layer driven in a state where it is divided into a plurality of domains, said liquid crystal display panel comprising:

a gate bus formed on said first transparent substrate, a data bus formed on said first transparent substrate to be insulated from said gate bus and perpendicular to said gate bus, a thin film transistor formed on said first transparent substrate and connected to both of said gate bus and said data bus, a first flattening film formed on said color filter layer formed on said first transparent substrate to cover said gate bus, said data bus and said thin film transistor, a control electrode formed on said first flattening film and connected to said thin film transistor through a contact hole formed in both said first flattening film and said color filter layer for being supplied with voltage to control said domains, a second flattening film formed on said control electrode, and a pixel electrode formed on said second flattening film and insulated from said control electrode.

7. A liquid crystal display panel as claimed in claim 6, said liquid crystal display panel further comprising an opposite electrode formed on said second transparent substrate, wherein:

said pixel electrode has electric potential decided by voltage difference between said control electrode and said opposite electrode, capacitance between said control electrode and said pixel electrode, and capacitance between said pixel electrode and opposite electrode.

8. A liquid crystal display panel as claimed in claim 6, said liquid crystal layer including liquid crystal molecules which have an orientation direction perpendicular to said first and said second transparent substrates, wherein said liquid crystal layer operates in a vertical aligned mode.

9. A liquid crystal display panel as claimed in claim 6, said pixel electrode has a slit to divide the liquid crystal layer into said domains.

10. A liquid crystal display panel including a first transparent substrate, a second transparent substrate, a liquid crystal layer sandwiched between said first transparent substrate and said second transparent substrate, and a color filter layer, said liquid crystal layer driven in a state where it divided into a plurality of domains, said liquid crystal display panel comprising:

a gate bus formed on said first transparent substrate, a data bus formed on said first transparent substrate to be insulated from said gate bus and perpendicular to said gate bus, a thin film transistor formed on said first transparent substrate and connected to both of said gate bus and said data bus, a control electrode formed on said color filter layer formed on said first transparent substrate, and connected to said thin film transistor through a contact hole formed in said color filter layer for being supplied with voltage to control said domains, a flattening film formed on said control electrode, and a pixel electrode formed on said flattening film and insulated from said control electrode.

11. A liquid crystal display panel as claimed in claim 10, said liquid crystal display panel further comprising an opposite electrode formed on said second transparent substrate, wherein:

said pixel electrode has electric potential decided by voltage difference between said control electrode and said opposite electrode, capacitance between said control electrode and said pixel electrode, and capacitance between said pixel electrode and opposite electrode.

12. A liquid crystal display panel as claimed in claim 10, said liquid crystal layer including liquid crystal molecules which have an orientation direction perpendicular to said first and said second transparent substrates, wherein said liquid crystal layer operates in a vertical aligned mode.

13. A liquid crystal display panel as claimed in claim 10, said pixel electrode has a slit to divide the liquid crystal layer into said domains.

14. A method of manufacturing a liquid crystal display panel including a first transparent substrate, a second transparent substrate, a liquid crystal layer sandwiched between said first transparent substrate and said second transparent substrate, and a color filter layer, said liquid crystal layer driven in a state where it divided into a plurality of domains, said method comprising:

forming a gate electrode and a gate bus continuous with said gate electrode on said first transparent substrate, forming a gate insulation film on said first transparent substrate to cover said gate electrode and said gate bus, forming a semiconductor layer formed on said gate insulation film above said gate electrode, forming a source electrode connected to semiconductor layer, a drain electrode connected to semiconductor layer, a data bus continuous with said source electrode on said first transparent substrate, forming a passivation film on said first transparent substrate so as to expose said source electrode, forming a color filter layer on said passivation film at a predetermined area, forming a black matrix on exposed area of said passivation film, forming a control electrode on said color filter layer so as to connect with said source electrode, forming a flattening film to cover said control electrode, and forming a pixel electrode on said flattening film so as to be insulated from said control electrode.

15. A manufacturing method as claimed in claim 14, said method further comprises forming an additional flattening film on said color filter and said black matrix before said control electrode is formed, wherein said control electrode is formed on said additional flattening film.

* * * * *